United States Patent Office 2,757,778
Patented Aug. 7, 1956

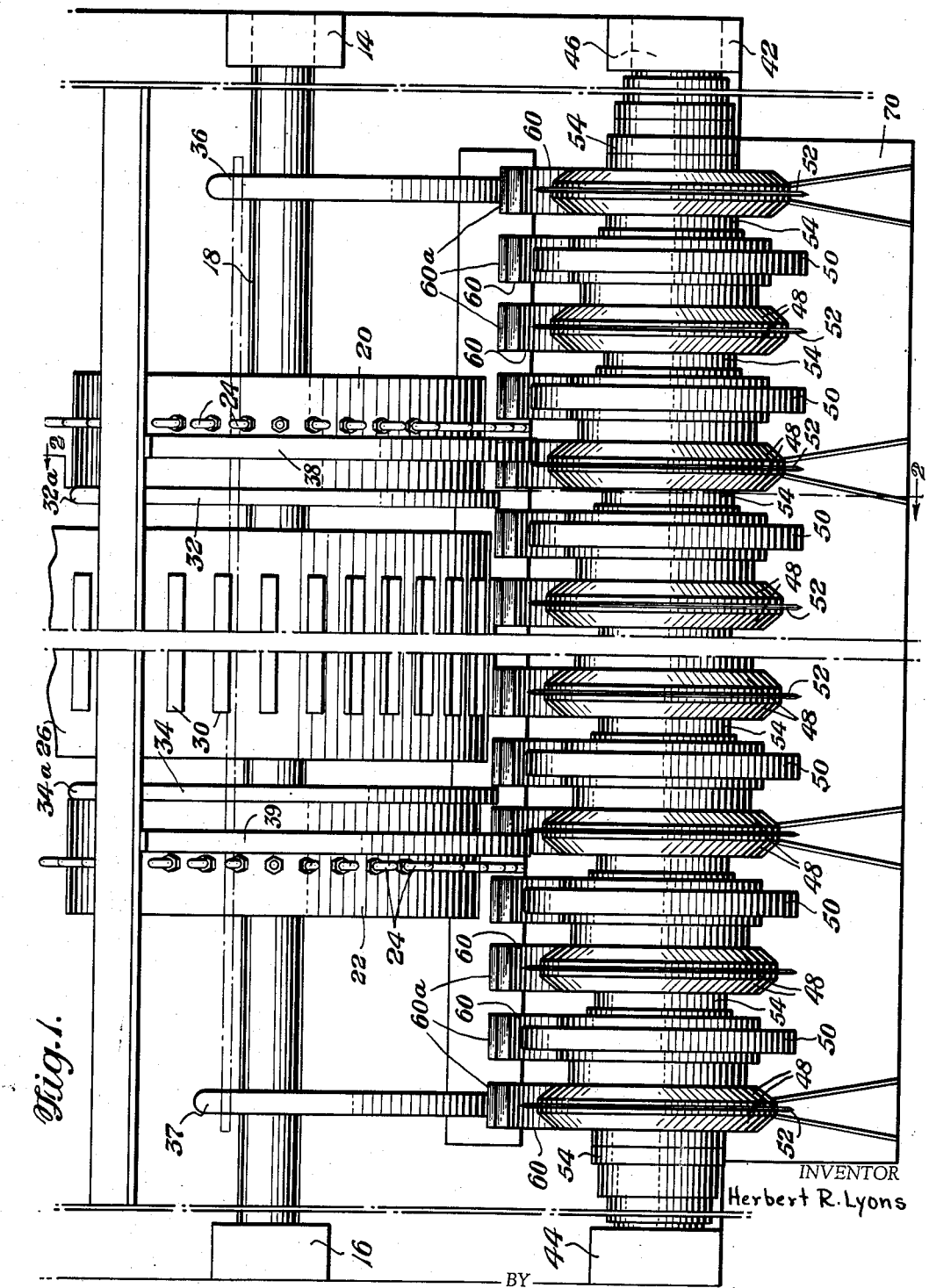

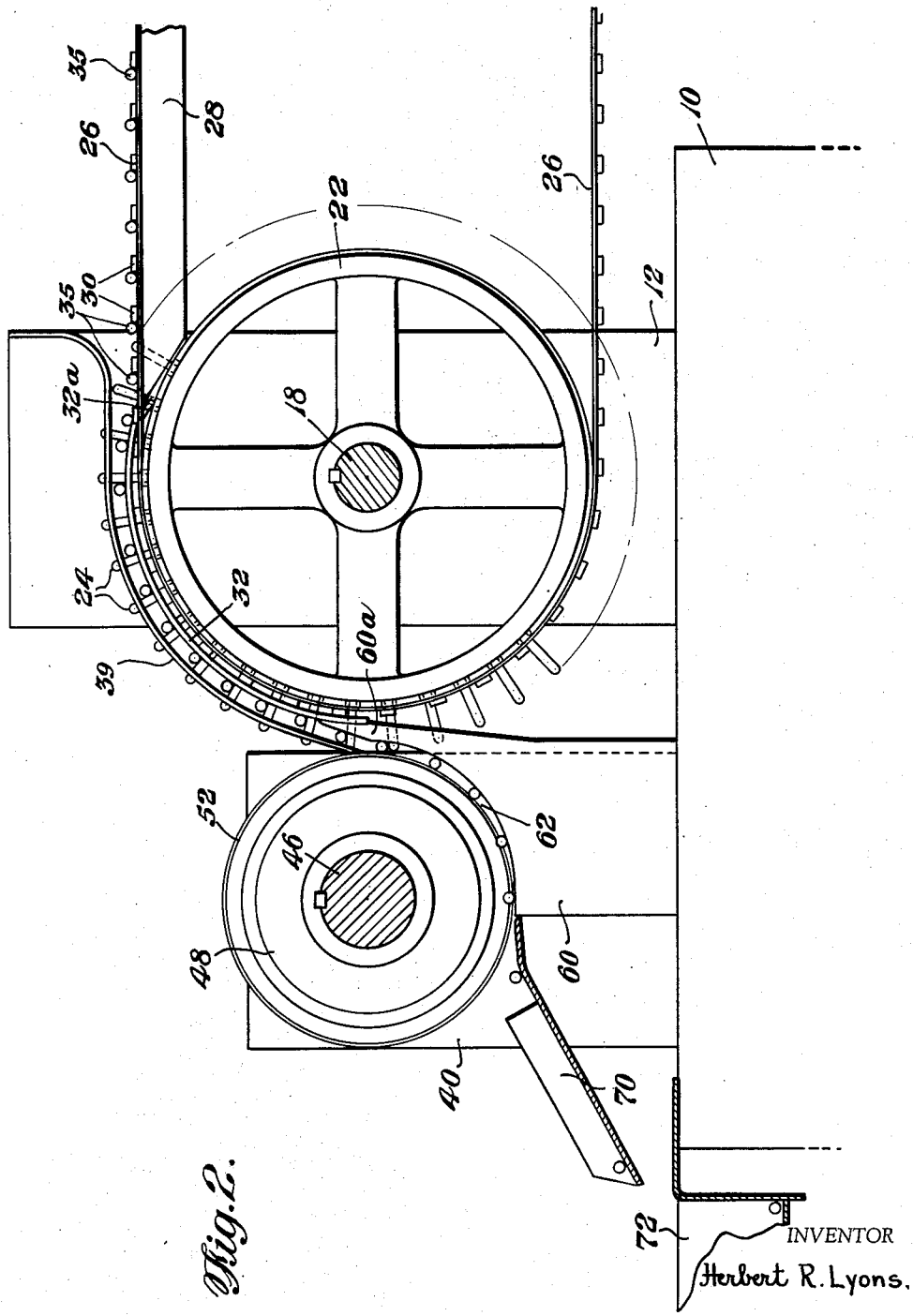

2,757,778

APPARATUS FOR FEEDING ELONGATED CYLINDRICAL OBJECTS

Herbert R. Lyons, Akron, Ohio, assignor to The Diamond Match Company, New York, N. Y., a corporation of Delaware Application June 23, 1952, Serial No. 295,088

3 Claims. (Cl. 198—25)

The present invention relates to the method and apparatus for severing sticks, rods, tubes, including paper sticks or the like. More particularly, the present invention relates to the method and apparatus for automatically feeding elongated rods or sticks to a cut-off device, the cut-off device including a series of stationary anvils upon which the rods or sticks are rolled and cut into desired lengths.

Prior to the instant invention, the machines heretofore known, which have been employed for cutting elongated paper sticks into shorter lengths, have generally been of the type which incorporated a rotatable carrier or some similar means.

The carrier in the heretofore known machines was designed so as to have the sticks to be cut positioned thereon while moving the sticks into engagement with a series of rotating knives or saws for the cut-off operation. This method of cutting sticks was found not entirely desirable since the cutting operation did not in every case completely sever the sticks. Moreover, the sticks that were severed were found to be rough at the severed joints and oftentimes undesirable for use.

Consequently, it is one of the objects of the present invention to provide a method and apparatus for cutting elongated sticks smoothly, efficiently and without any traces of burrs.

Another object of the present invention is to provide a paper stick cut-off machine whereby the elongated paper sticks are transferred to a series of anvils whereupon a series of cutters engage the stick for the cutting operation.

Another object of the present invention is to provide each of the anvils with a concave cylindrical surface.

Still another object of the present invention is to provide a rotatable carrier for automatically transferring the elongated paper sticks to the anvils.

Still another object of the present invention is to provide a series of cutters or knives mounted adjacent the anvils for cutting the paper sticks into the desired sizes.

Other objects and the nature and advantages of the instant invention will be apparent from the following description taken in conjunction with the accompanying drawings, wherein:

Fig. 1 is a plan view of the cut-off machine illustrating the arrangement of the cutters and corresponding anvils; and Fig. 2 is a vertical section taken along the line 2—2 of Fig. 1.

Referring to the drawings, a support 10 is illustrated supporting the stick or rod cut-off apparatus which includes a frame 12. The frame 12 has journalled therein bearings 14, 16 which have mounted for rotation therein a shaft 18 driven by suitable power means (not shown). Secured for rotation with the shaft 18 are drums 20, 22. The drums 20, 22 which are suitably spaced apart on the shaft 18 have attached to the outer surfaces thereof a plurality of equally spaced upstanding pins 24, the purpose of which will hereinafter be described.

Referring now to Fig. 2, a continuously driven conveyor or belt 28 supported by a frame 28 is driven by a suitable rotatable drum element (not shown) mounted for rotation on shaft 18 between the drums 20, 22. The belt 26, which is operatively positioned between the drums 20, 22, has secured thereon a plurality of equally spaced-apart flight members 30.

Suitably secured to the frame 12 are inner pick-up members 32, 34 which are illustrated in Fig. 2 as elongated curved fingers. The pick-up members 32, 34 follow generally the curvature of the drums 20, 22, and include integral end portions 32a, 34a. The pick-up end portions 32a, 34a extend from a point level with belt 26 to a point somewhat below the level of the belt 26 and are adapted to receive thereon elongated stick members 35 carried by said belt between the flight members 30. As shown in Fig. 1, the belt 26 passes between the pick-up members 32, 34 as it moves around its driving drum. It is apparent, therefore, that as the elongated sticks 35 carried by the belt 26 between the flight members 30 move toward the drums 20, 22, they contact the pick-up end portions 32a, 34a. The upstanding pins 24 rotating with the drums then engage the sticks and carry them over the surfaces of the pick-up members 32, 34, toward the cut-off station. Outer pick-up members 36, 37 are similar in construction to inner pick-up members 32, 34 and aid in the pick-up and transfer operation. The members 36, 37 are secured to frame 12 and, as shown in Fig. 1, are located outside the ends of the drums 20, 22.

In order to retain the sticks 35 on the pick-up elements and pins as they are transferred toward the cut-off station, a pair of guard fingers 38, 39 are provided. The guard fingers 38, 39, which are shown in Fig. 1 as elongated curved members, are suitably secured to the frame 12 and are disposed above the drums 20, 22, respectively, in generally concentric relation thereto. It is apparent that the position of the guard fingers 38, 39 will prevent the sticks 35, which are transferred by pins 24 over elements 32, 34 and 36, 37, from sliding therefrom, which sliding movement is brought about by the rotation of the drums 20, 22.

Adjacent the frame 12, and mounted on support 10, is a second frame 40. The frame 40 has journalled therein bearings 42, 44 which have rotatably mounted therein a shaft 46. Secured to the shaft 46 for rotation therewith are cutter elements 48 which are suitably clamped together and comprise with cutter blades 52 the cutter wheels. Alternately spaced with each cutter wheel and secured to the shaft 46 for rotation therewith are driving elements 50. The driving elements 50 are formed with a diameter equal to that of the cutter wheels and are suitably covered with rubber or the like to aid in moving the sticks 35 during the cutting operation. Mounted at each end of the shaft 46 and between the cutter wheels and driving elements 50 are spacers 54. Each of the spacers 54 is conveniently positioned on the shaft 40 so as to vary the space between the cutter wheels, thereby providing a means for varying the lengths of the finished cut paper stick elements.

Mounted on the support 10 adjacent the cutter wheels and driving elements 50 are a series of stationary anvils 60. As illustrated in Fig. 2, each of the anvils 60 is formed with a concave cylindrical face which is positioned adjacent a cutter blade 52 or driving element 50. The stationary anvils 60 are located such that the cylindrical faces formed thereon are disposed in eccentric relation with respect to a corresponding cutter blade 52 or driving element. The eccentric positioning of the cutter blades 52 with respect to the corresponding anvil faces forms a series of gradually decreasing cutting channels 62 through which the paper sticks are adapted to be rolled during the cut-off operation. The concave faces of the anvil 60 taper into a series of finger-like extensions 60a which extend upwardly above the lower extensions of the pick-up elements and guard fingers. The extensions 60a are adapted to guide the elongated sticks 35 from their position on the pick-up elements and pins 24 to the cylindrical faces of the anvils.

Located adjacent the cutting channels 62 and suitably supported by the frame 40 is a chute 70 which receives the newly cut stick elements and directs them toward a hopper 72 from where they are removed for further handling.

The operation of the above-described apparatus is as follows:

The elongated sticks 35, which are to be cut into desired lengths, are placed between the flight members 30 on the continuously driven conveyor belt 26. As the belt 26 and associated flight members 30 move the elongated sticks 35 toward the drums 20, 22, the sticks are engaged by the pick-up elements 32, 34. The upstanding pins 24 secured to the drums 20, 22 and rotating with the drums, then contact the sticks 35 and move them over the curved surfaces of the pickup elements toward the anvils 60. As the sticks 35 are moved in a counter-clockwise direction over the stationary pick-up elements by the pins 24 in the direction toward the anvils 60 (see Fig. 2) they roll from engagement with one set of pins 24 to engagement with another set of pins 24. The guards 38, 39 which are mounted generally concentric with respect to the drum and pick-up elements, are arranged to prevent the sticks 35 from sliding off the pins 24 as the anvils 60 are approached. As the drums 20, 22 rotate in the counter-clockwise direction, as seen in Fig. 2, the attached pins 24 move the sticks toward the gradually decreasing channels 62 defined by the cutter blades 52 and the anvils 60. The extension 60a of the anvils extends upwardly and is adapted to direct the sticks 35 into the channels 62 as the sticks roll thereinto from the pins 24. Due to the spaced-apart arrangement of the drums 20, 22, the pins 24 carry the sticks toward the anvils in a horizontal position. Consequently, as the sticks leave the pins and roll onto the anvils 60 they are received thereon in a horizontal position. Thus, an even cut by all the cutter blades 53 is assured as the sticks are moved through the cutting channels 60 during the cut-off operation. The driving elements 50, which are covered with a rubber surface or the like, engage each stick 35 as it is dropped onto the anvils 60 and thereby aid in rolling each stick over the faces of the anvils 60 during the cut-off operation. Since the stick diameters are approximately the same dimension as the opening of the large section of channel 62, the cutter blades 52 will begin the cutting operation as soon as the sticks begin to roll down the concave faces of the anvils 60. When the sticks 35 reach the end of the anvils, the cut-off operation is complete. The newly cut-off sticks are then passed from the anvils 60 to the chute 70 and then into hopper 72 from where they are removed for further handling.

From the foregoing, it is apparent that the present invention provides a method and apparatus for cutting rods, paper sticks and the like into lengths that is not only efficient but entirely automatic. The resulting rods, sticks or the like are cleanly cut into the desired lengths by the cutters by the simple movement of the elongated rods or sticks passing through the gradually reducing cut-off channels. The driving elements mounted for rotation with the cutters insure the rolling movement of the sticks over the anvils and thereby insure even and cleanly cut-off sticks. The cylindrical faces of the anvils, which are disposed in eccentric relation with respect to the cutter wheels and driving elements, enable the cut-off operation to be accomplished simply and efficiently by providing the necessary surfaces over which the elongated sticks are rolled and cut into the desired lengths.

It will be obvious to those skilled in the art that various changes may be made without departing from the spirit of the invention and therefore the invention is not limited to what is shown in the drawings and described in the specification but only as indicated in the appended claims.

What is claimed is:

1. In apparatus for feeding elongated cylindrical objects, spaced coaxial rotatable members, means disposed between said members for conveying said objects thereto, means located adjacent said rotatable members for removing said objects from said conveying means, means secured to said rotatable members and extending outwardly therefrom for engaging and feeding said objects over said removing means, and means mounted over said rotatable members for preventing said objects from sliding from said engaging means as said rotatable members are rotated.

2. Apparatus for cutting sticks or the like, comprising a frame, a pair of drums rotatably mounted in said frame, conveying means operatively disposed between said drums conveying said sticks toward said drums, pick-up members mounted on said frame for picking up said sticks from said conveying means, upstanding pins secured to said drums for engaging said sticks on said pick-up members and transferring said sticks thereover, and curved guard fingers mounted on said frame above said drums for preventing said sticks from sliding from said pins as said drums rotate.

3. Apparatus for cutting paper sticks or the like, comprising rotatable drum members, means operatively disposed between said drum members for conveying said sticks to said drum members, means located adjacent said conveying means for picking up said sticks from said conveying means, transfer means mounted on said drum members perpendicular to the axis of rotation thereof, and guard means mounted over said drum members for preventing said sticks from sliding from said transfer means as said drum members rotate.

References Cited in the file of this patent

UNITED STATES PATENTS

| | | |
|---|---|---|
| 459,920 | Wright | Sept. 22, 1891 |
| 936,026 | Palmowsky | Oct. 5, 1909 |
| 1,177,146 | Sheehan | Mar. 28, 1916 |
| 1,594,821 | Dulligan | Aug. 3, 1926 |
| 1,771,295 | Hafleigh | July 22, 1930 |
| 2,321,735 | Clifford | June 15, 1943 |
| 2,335,710 | Townsend | Nov. 30, 1943 |
| 2,339,097 | Muse | Jan. 11, 1944 |
| 2,586,424 | Gazette | Feb. 19, 1952 |
| 2,608,285 | Davidson | Aug. 26, 1952 |
| 2,628,701 | Schrage | Feb. 17, 1953 |

FOREIGN PATENTS

| | | |
|---|---|---|
| 264,900 | Great Britain | Jan. 21, 1927 |